(12) United States Patent  (10) Patent No.: US 8,180,119 B2
Kajihara et al.  (45) Date of Patent: May 15, 2012

(54) IMAGING APPARATUS AND IMAGING METHOD

(75) Inventors: Junji Kajihara, Tokyo (JP); Kenji Yamamoto, Kanagawa (JP); Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1201 days.

(21) Appl. No.: 11/987,449

(22) Filed: Nov. 30, 2007
(Under 37 CFR 1.47)

(65) Prior Publication Data
US 2008/0159599 A1   Jul. 3, 2008

(30) Foreign Application Priority Data

Dec. 4, 2006  (JP) .................................. 2006-326751
Nov. 15, 2007  (JP) .................................. 2007-296631

(51) Int. Cl.
*G06K 9/00*  (2006.01)
(52) U.S. Cl. ....................................................... 382/124
(58) Field of Classification Search .................... 382/124
See application file for complete search history.

(56) References Cited

U.S. PATENT DOCUMENTS 6,401,551 B1 *  6/2002  Kawahara et al. ........ 73/862.337
2008/0075330 A1 *  3/2008  Matsumura et al. .......... 382/115

FOREIGN PATENT DOCUMENTS

| JP | 63-123168 | 5/1988 |
| JP | 07-021373 | 1/1995 |
| JP | 2003-084259 A | 3/2003 |
| JP | 2006-011711 A | 1/2006 |
| JP | 2006-218019 A | 8/2006 |
| JP | 2006-285487 | 10/2006 |
| WO | WO-2006/038276 A1 | 4/2006 |

OTHER PUBLICATIONS

R. Shogenji et al., "Bimodal fingerprint capturing system based on compound-eye imaging module", Applied Optics, vol. 43 No. 6 (2004), pp. 1355-1359, Feb. 20, 2004.
Japanese Office Action issued Sep. 27, 2011 for corresponding Japanese Application No. 2007-296631.

* cited by examiner

*Primary Examiner* — Anand Bhatnagar
*Assistant Examiner* — Soo Park
(74) *Attorney, Agent, or Firm* — Rader Fishman & Grauer, PLLC (57) ABSTRACT

A biometrics authentication system capable of easily performing biometrics authentication is provided. A biometrics authentication system includes: a microlens array section including a plurality of microlenses; an image pickup device for receiving light condensed by each microlens in the microlens array section from each different part of a living organism to obtain image pickup data of each part; an image processing section for producing a single image pickup data of the living organism on the basis of the image pickup data of each part captured by the image pickup device; and an authentication section for performing at least vein authentication using a vein of the living organism on the basis of the single image pickup data captured by the image processing section.

9 Claims, 6 Drawing Sheets

IMAGING APPARATUS AND IMAGING METHOD

CROSS REFERENCES TO RELATED APPLICATIONS

The present invention contains subject matter related to Japanese Patent Application JP 2006-326751 filed in the Japanese Patent Office on Dec. 4, 2006 and Japanese Patent Application JP 2007-296631 filed in the Japanese Patent Office on Nov. 15, 2007, the entire contents of which being incorporated herein by references.

BACKGROUND OF THE INVENTION

1. Field of the Invention

The present invention relates to a biometrics authentication system and a biometrics authentication method using an image pickup device.

2. Description of the Related Art

As a method of authenticating living organisms, various methods have been proposed and practically used in the past. Examples of the various methods include fingerprint authentication (for example, refer to Japanese Unexamined Patent Application Publication No. S63-123168 and Japanese Patent No. 3150126) or vein authentication (for example, refer to Japanese Unexamined Patent Application Publication Nos. H7-21373 and 2006-288872) and the like.

Moreover, recently, a technique of performing fingerprint authentication and vein authentication with one system has been proposed (for example, refer to Japanese Unexamined Patent Application Publication No. 2006-285487).

SUMMARY OF THE INVENTION

In Japanese Unexamined Patent Application Publication No. 2006-288872, as a system configuration for performing biometrics authentication (in this case, vein authentication), a system including an image pickup device and a lens array using a rod lens is used. However, in the case where such a rod lens is used, it is necessary to scan a living organism as an object subjected to image pickup at the time of picking up an image, so an image pickup process is complicated. Therefore, in such a configuration, it is difficult to easily perform biometrics authentication.

In view of the foregoing, it is desirable to provide a biometrics authentication system and a biometrics authentication method capable of easily performing biometrics authentication.

According to an embodiment of the invention, there is provided a biometrics authentication system including: a microlens array section including a plurality of microlenses; an image pickup device for receiving light condensed by each microlens in the microlens array section from each different part of a living organism to obtain image pickup data of each part; an image processing section for producing a single image pickup data of the living organism on the basis of the image pickup data of each part captured by the image pickup device; and an authentication section for performing at least vein authentication using a vein of the living organism on the basis of the single image pickup data captured by the image processing section.

In the biometrics authentication system according to the embodiment of the invention, light condensed by each microlens in the microlens array section from each different part of the living organism is received by the image pickup device, and the image pickup data of each part is captured. Moreover, on the basis of the image pickup data of each part, a single image pickup data of the living organism is obtained by the image processing section. Then, on the basis of the single image pickup data, at least vein authentication is performed. Therefore, at the time of picking up an image, it is not necessary to perform scanning or the like on the living organism as an object subjected to image pickup, so an image pickup process is simplified.

In the biometrics authentication system according to the embodiment of the invention, the above-described microlenses may be capable of changing a refraction direction of an incident light ray according to an applied voltage, and the biometrics authentication system may include a voltage supplying section for applying a voltage to the microlenses. In such a configuration, according to the magnitude of a voltage applied to the microlenses from the voltage supplying section, the refraction direction of an incident light ray to the microlenses is changed, thereby the focal length is changed. Therefore, switching of authentication modes between biometrics authentication on the basis of image pickup data in the case where an image of a living organism is picked up with an increased focal length (for example, vein authentication) and biometrics authentication on the basis of image pickup data in the case where an image of the living organism is picked up with a reduced focal length (for example, fingerprint authentication) can be performed.

According to an embodiment of the invention, there is provided a biometrics authentication method including: a data capturing step of picking up an image of a living organism by a plurality of microlenses and an image pickup device, receiving light condensed by each microlens from each different part of the living organism to obtain image pickup data of each part, and capturing a single image pickup data of the living organism by performing image processing on the basis of the captured image pickup data of each part; and an authentication step of performing at least vein authentication using a vein of the living organism on the basis of the captured single image pickup data.

In the biometrics authentication method according to the embodiment of the invention, an image of the living organism is picked up by a plurality of microlenses and the image pickup device, thereby light condensed by each microlens from each different part of the living organism is received to capture image pickup data of each part. Moreover, image processing is performed on the basis of the image pickup data of each part to capture a single image pickup data of the living organism. Then, on the basis of the single image pickup data, at least vein authentication is performed. Therefore, at the time of picking up an image, it is not necessary to perform scanning or the like on the living organism as an object subjected to image pickup, so an image pickup process is simplified.

In the biometrics authentication method according to the embodiment of the invention, in the data capturing step, through the use of a plurality of microlenses capable of changing the refraction direction of an incident light ray according to an applied voltage, an image of a living organism may be picked up while changing the refraction direction of an incident light ray by changing a voltage applied to each microlens, and then vein image pickup data and fingerprint image pickup data of the living organism may be captured, and in the authentication step, vein authentication and fingerprint authentication may be performed on the basis of the captured vein image pickup data and the captured fingerprint image pickup data. In such a configuration, while a voltage applied to the microlenses is changed, an image of a living organism is picked up. Then, the refraction direction of an incident light ray to the microlenses is changed according to the magnitude of the applied voltage, thereby the focal length is changed. Therefore, when an image of the living organism is picked up with an increased focal length, vein image pickup data is captured, and when an image of the living organism is picked up with a reduced focal length, fingerprint image pickup data is captured. Then, vein authentication is performed on the basis of the captured vein image pickup data, and fingerprint authentication is performed on the basis of the captured fingerprint image pickup data.

In the biometrics authentication system according to the embodiment of the invention, the microlens array section including a plurality of microlenses and the image pickup device for receiving light condensed by each microlens from each different part of a living organism to obtain image pickup data of each part and the image processing section for producing a single image pickup data of the living organism on the basis of the image pickup data of each part are included, so the image pickup process can be simplified. Therefore, compared to related arts, biometrics authentication can be easily performed.

In particular, in the case where the microlenses are capable of changing the refraction direction of an incident light ray according to an applied voltage, and the voltage supplying section for applying a voltage to the microlenses is included, according to the magnitude of the voltage, the focal length of the incident light ray is changed, and switching of the authentication mode between biometrics authentication in the case where image pickup is performed with an increased focal length (for example, vein authentication) and biometrics authentication in the case where image pickup is performed with a reduced focal length (for example, fingerprint authentication) can be performed. Moreover, a common image pickup optical system between these authentication modes is used, so the complication of the system configuration can be prevented. Therefore, fingerprint authentication and vein authentication can be used with a simple configuration.

Moreover, in the biometrics authentication method according to the embodiment of the invention, an image of a living organism is picked up by a plurality of microlenses and the image pickup device, and light condensed by each microlens from each different part of the living organism is received to obtain image pickup data of each part, and a single image pickup data of the living organism is captured by performing image processing on the basis of the captured image pickup data of each part, so the image pickup process can be simplified. Therefore, compared to related arts, biometrics authentication can be easily performed.

In particular, in the case where through the use of a plurality of microlenses capable of changing the refraction direction of an incident light ray according to an applied voltage, an image of a living organism is picked up while changing the refraction direction of an incident light ray by changing a voltage applied to each microlens, and then vein image pickup data and fingerprint image pickup data of the living organism are captured, and vein authentication and fingerprint authentication are performed on the basis of the captured vein image pickup data and the captured fingerprint image pickup data, according to the magnitude of the applied voltage, the focal length of the incident light ray is changed, and in the case where an image of the living organism is picked up with an increased focal length, vein image pickup data can be captured, and in the case where an image of the living organism is picked up with a reduced focal length, fingerprint image pickup data can be captured. Moreover, a common image pickup optical system between the authentication modes is used, so the complication of the system configuration can be prevented. Therefore, fingerprint authentication and vein authentication can be used with a simple configuration.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
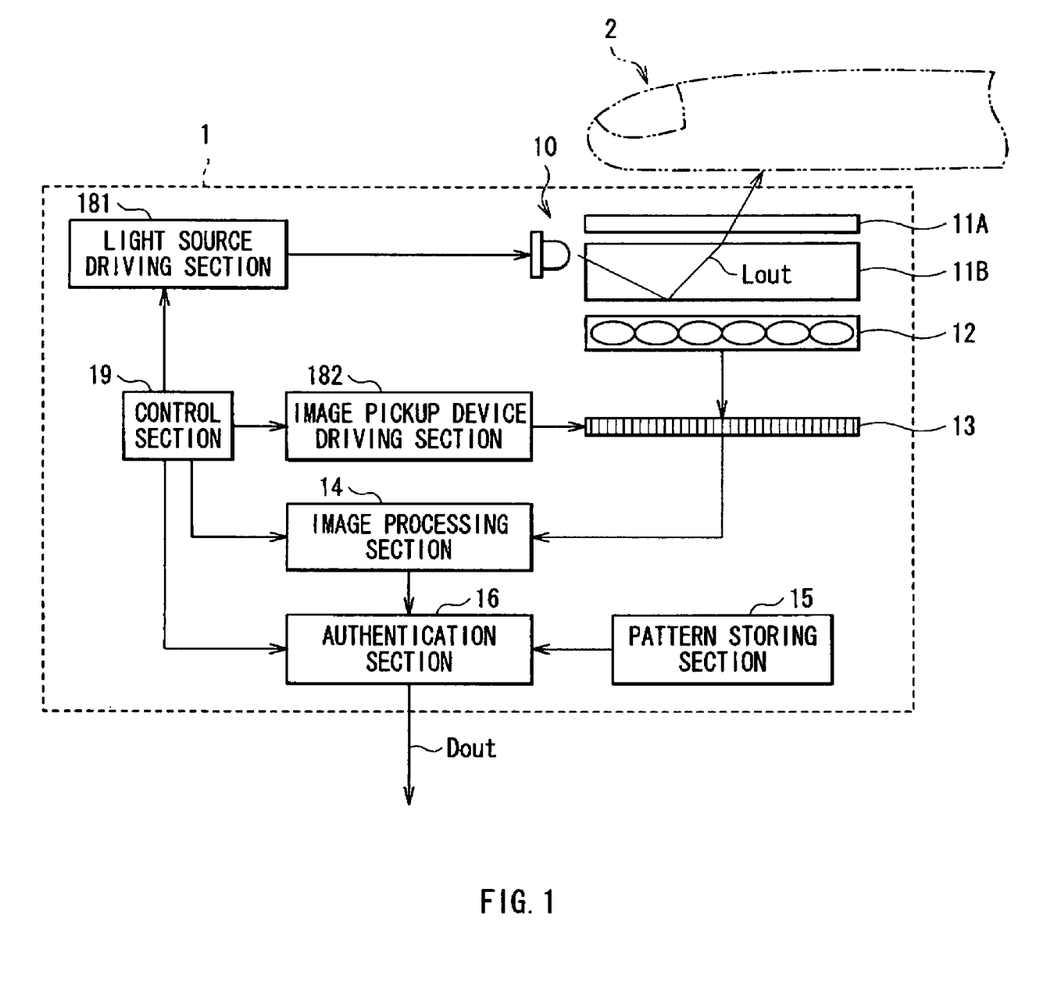
FIG. 1 is a functional block diagram showing the configuration of a biometrics authentication system according to a first embodiment of the invention.

FIG. 1 shows a sectional view of a biometrics authentication system (a biometrics authentication system 1) according to a first embodiment of the invention. The biometrics authentication system 1 picks up an image of a living organism (for example, fingertip) 2 as an object subjected to image pickup to perform vein authentication using a vein of the living organism 2, and outputs authentication result data Dout, and the biometrics authentication system 1 includes a light source 10, a cover glass 11A, a light guide section 11B, a microlens array 12, an image pickup device 13, an image processing section 14, a pattern storing section 15, an authentication section 16, a light source driving section 181, an image pickup device driving section 182 and a control section 19. A biometrics authentication method according to an embodiment of the invention is embodied by the biometrics authentication system according to the first embodiment, so the biometrics authentication method will be also described below.

The light source 10 applies light to the living organism 2 as an object subjected to image pickup, and is formed of, for example, an LED (Light Emitting Diode) or the like. The light source 10 is arranged on the same side of a detection section (not shown) (below the detection section) where the living organism 2 is placed as a side where the microlens array 12 or the image pickup device 13 is arranged. The light source 10 preferably emits light of a near-infrared wavelength region (a wavelength region approximately from 700 nm to 1200 nm). It is because in the case where light of such a wavelength region is used, by the balance between the transmittance through a living organism and the absorption into reduced hemoglobin (a vein) in the living organism, light use efficiency in the case of performing the vein authentication of the living organism 2 can be further improved.

As shown in FIG. 1, the light guide section 11B is a section guiding light Lout emitted from the light source 10 toward the living organism 2, and is formed of, for example, a glass substrate, an optical fiber or the like. The cover glass 11A is arranged on the light guide section 11B, and is a section protecting the interior of the biometrics authentication system 1. In addition, the cover glass 11A is a section where the living organism 2 is placed at the time of authentication.

The microlens array 12 includes a plurality of microlenses arranged in a matrix form, and is arranged below the light guide section 11B (more specifically between the light guide section 11B and the image pickup device 13). The microlenses in the microlens array 12 function as image pickup lenses for picking up an image of the living organism 2 as an object subjected to image pickup.

The image pickup device 13 obtains image pickup data of each different part of the living organism 2 on the basis of light condensed by each microlens in the microlens array 12 from each different part of the living organism 2, and is arranged on a focal plane of the microlens array 12. In addition, the image pickup device 13 includes, for example, a plurality of CCDs (Change Coupled Devices) arranged in a matrix form.

The image processing section 14 performs predetermined image processing on the image pickup data of each part captured in the image pickup device 13 in response to the control of the control section 19 to produce a single image pickup data of the living organism 2, and then outputs the image pickup data to the authentication section 16. In addition, the image processing section 14, and the authentication section 16 and the control section 19 which will be described later each include, for example, a microcomputer or the like.

The pattern storing section 15 is a section storing a biometrics authentication pattern (which is a comparison pattern relative to an image pickup pattern captured by image pickup at the time of authentication, and which is captured by picking up an image of a living organism in advance), and includes a nonvolatile memory device (for example, an EEPROM (Electrically Erasable Programmable Read Only Memory) or the like). The authentication section 16 is a section performing authentication (in this case, vein authentication) of the living organism 2 as an object subjected to image pickup by comparing a single image pickup pattern outputted from the image processing section 14 to the biometrics authentication pattern stored in the pattern storing section 15 in response to the control of the control section 19.

The light source driving section 181 drives the light source 10 to emit light in response to the control of the control section 19. The image pickup device driving section 182 drives the image pickup device 13 to pick up an image (to receive light) in response to the control of the control section 19.

The control section 19 controls the operations of the image processing section 14, the authentication section 16, the light source driving section 181 and the image pickup device driving section 182. More specifically, the control section 19 controls the operations of the image processing section 14, the light source driving section 181 and the image pickup device driving section 182 as appropriate.

Figure 2:
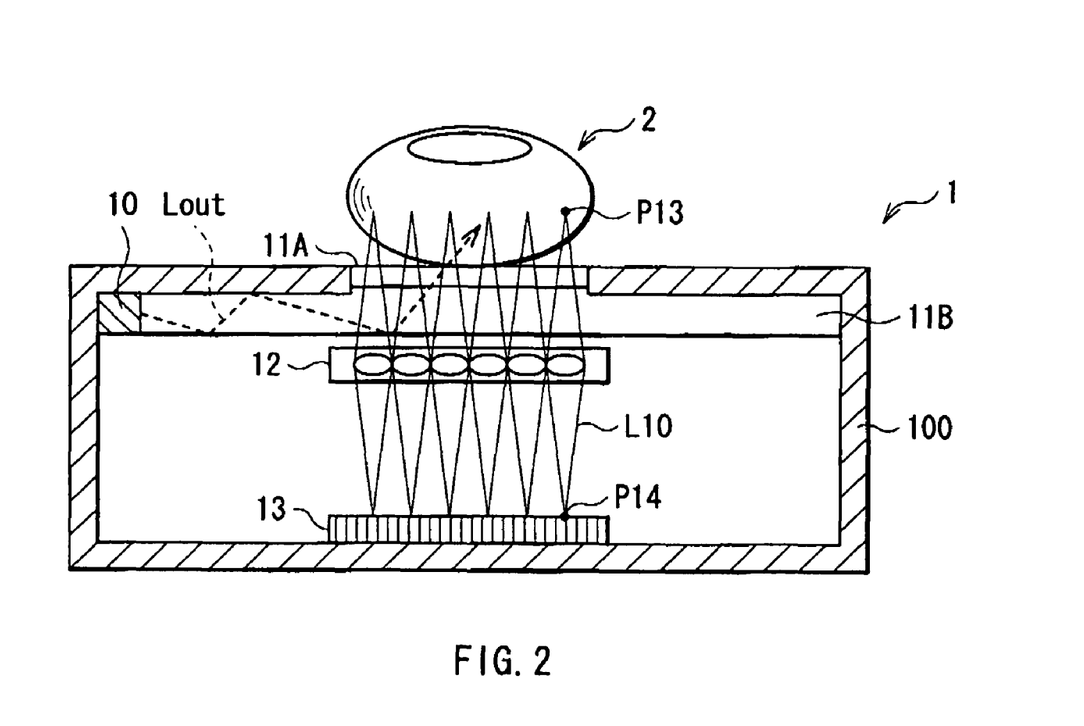
FIG. 2 is a sectional view of essential parts for describing an example of an optical path when capturing a finger vein pattern in the first embodiment.

Next, referring to FIGS. 1 and 2, the operation (a biometrics authentication process) of the biometrics authentication system 1 according to the embodiment will be described in detail below. FIG. 2 shows a sectional view of essential parts for describing the biometrics authentication process, and shows an example of an optical path when capturing a finger vein pattern.

In the biometrics authentication system 1, at first, when the living organism (for example, a fingertip) 2 is placed on the cover glass 11A, light Lout is emitted from the light source 10 by the driving operation of the light source driving section 181, and the light Lout is applied to the living organism 2 through the light guide section 11B and the cover glass 11A.

In this case, for example, the focal points of the microlenses are adjusted to the interior of the living organism 2 (a vein portion; for example, a point P13 on a light ray L10 in FIG. 2) and the top surface of the image pickup device 13 (for example, a point P14 on the light ray L10 in FIG. 2), thereby image pickup data of a vein of each part of the living organism 2 is captured. Then, the captured image pickup data of the vein of each part is subjected to image processing in the image processing section 14, thereby a single image pickup data of the vein of the living organism 2 (a vein pattern) is obtained, and is inputted into the authentication section 16.

Next, in the authentication section 16, the inputted vein pattern is compared to the authentication pattern for vein authentication stored in the pattern storing section 15, thereby vein authentication is performed. Thereby the biometrics authentication process in the embodiment is completed.

As described above, in the embodiment, the microlens array 12 including a plurality of microlenses and the image pickup device 3 receiving light condensed by each microlens from each different part of the living organism 2 to obtain the image pickup data of each part, and the image processing section 3 producing a single image pickup data of the living organism 2 on the basis of the image pickup data of each part are arranged, so at the time of picking up an image, it is not necessary to perform scanning or the like on the living organism 2 as an object subjected to image pickup, therefore, an image pickup process can be simplified. Therefore, compared to related arts, biometrics authentication can be easily performed.

Moreover, in the authentication section 16, vein authentication using the vein of the living organism 2 is performed, so compared to fingerprint authentication using a fingerprint of the living organism 2, the accuracy of authentication can be improved.

Further, the image of the living organism 2 is picked up in a state in which the light Lout from the light source 10 is applied to the living organism 2, so an object subjected to image pickup can be highlighted, and clear image pickup data can be captured. Therefore, compared to the case where image pickup is performed only with natural light, the accuracy of authentication can be further improved.

In the case where the light source 10 emits near-infrared light, while the transmittance of light to the living organism 2 is improved, the absorption of light into the vein of the living organism 2 can be improved. Therefore, in such a configuration, the vein as an object subjected to image pickup can be highlighted more clearly, and the accuracy of vein authentication can be further improved.

Second Embodiment

Figure 3:
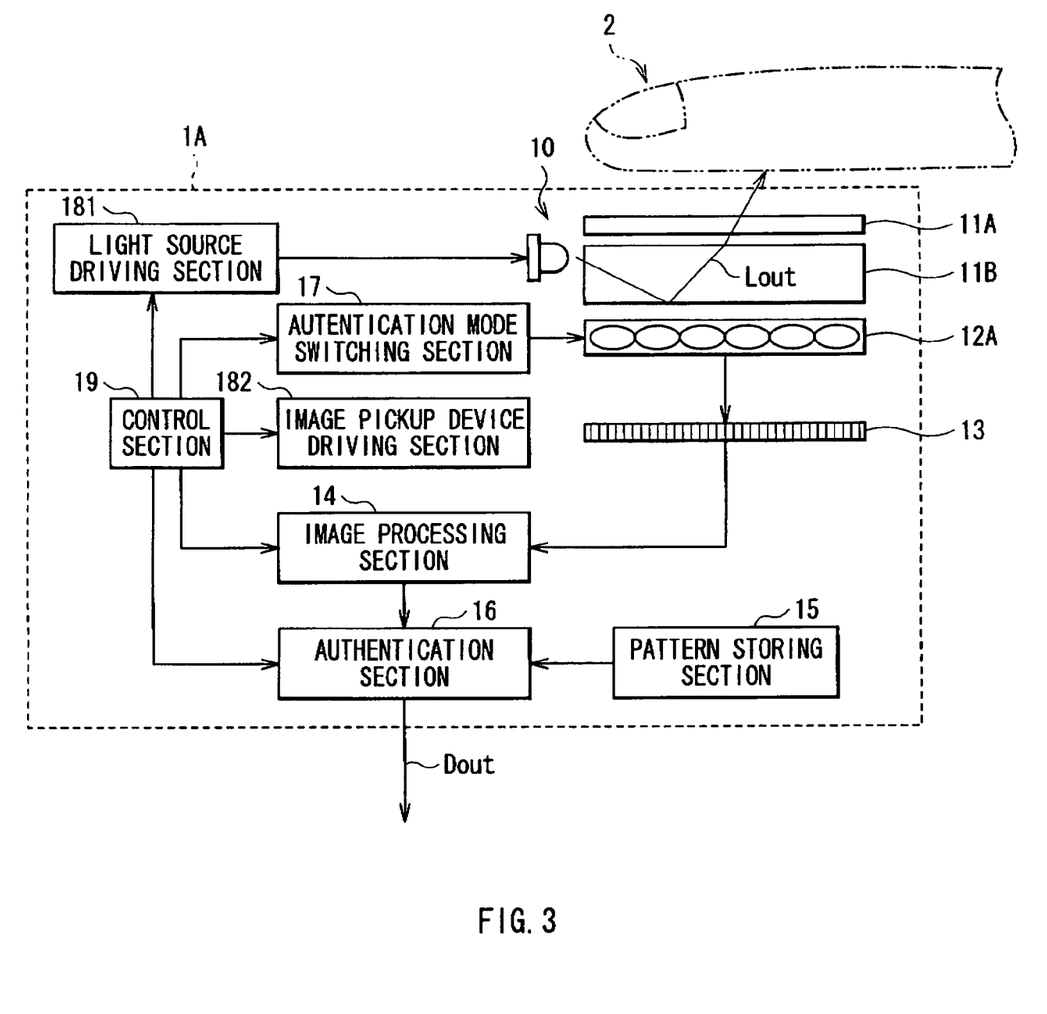
FIG. 3 is a functional block diagram showing the configuration of a biometrics authentication system according to a second embodiment of the invention.

FIG. 3 shows a sectional view of a biometrics authentication system (a biometrics authentication system 1A) according to a second embodiment of the invention. The biometrics authentication system 1A includes a microlens array 12A instead of the microlens array 12 in the biometrics authentication system 1, and further includes an authentication mode switching section 17. A biometrics authentication method according to a second embodiment of the invention is embodied by the biometrics authentication system according to the embodiment, so the biometrics authentication method will be also described below.

The microlens array 12A includes a plurality of microlenses arranged in a matrix form, and is arranged below the light guide section 11B (more specifically between the light guide section 11B and the image pickup device 13). The microlenses in the microlens array 12A function as image pickup lenses for picking up an image of the living organism 2 as an object subjected to image pickup. A specific configuration of the microlens array 12A will be described later.

The authentication mode switching section 17 supplies a voltage to the microlenses in the microlens array 12A, and the authentication mode switching section 17 switches between two authentication modes (that is, a vein authentication mode using image pickup data of a vein of the living organism 2 (a vein pattern) and a fingerprint authentication mode using image pickup data of a fingerprint of the living organism 2 (a fingerprint pattern)) according to the magnitude of the supplied voltage, and more details will be described later. The authentication mode switching section 17 corresponds to a specific example of "a voltage supplying section" in the invention.

The control section 19 controls the operations of the image processing section 14, the authentication section 16, the authentication mode switching section 17, the light source driving section 181 and the image pickup device driving section 182. More specifically, the control section 19 controls the operations of the image processing section 14, the light source driving section 181 and the image pickup device driving section 182 as appropriate, and the control section 19 controls the operation of the authentication section 16 and the authentication mode switching section 17 according to the above-described two authentication modes, and more details will be described later.

Figure 4:
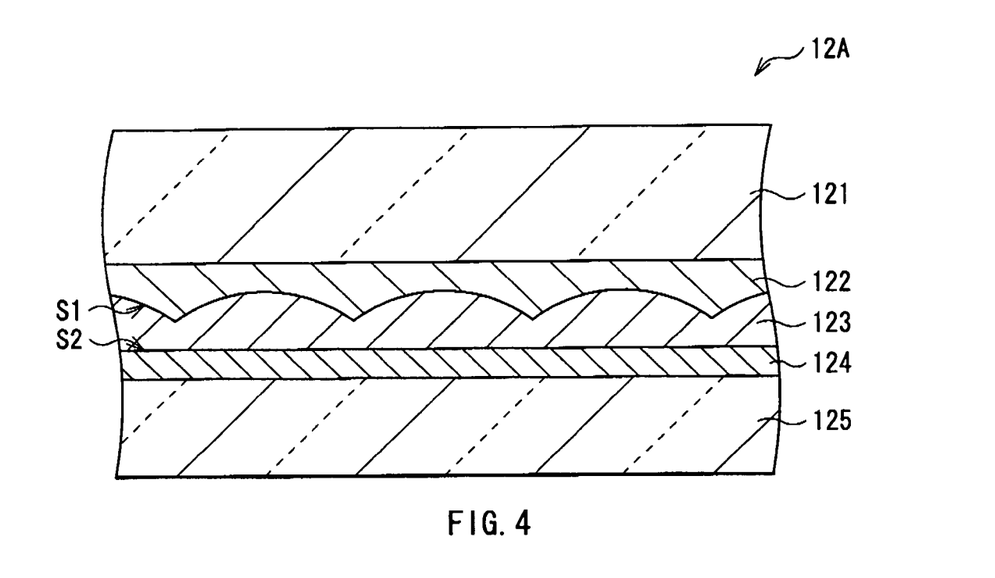
FIG. 4 is an enlarged sectional view of a microlens array shown in FIG. 3.

Next, referring to FIG. 4, the specific configuration of the microlens array 12A will be described below. FIG. 4 shows a sectional view of the microlens array 12A.

In the microlens array 12A, a liquid crystal layer 123 is formed between a pair of facing substrates 121 and 125, and electrodes 122 and 124 are formed between the liquid crystal layer 123 and the substrate 121 and between the liquid crystal layer 123 and the substrate 125, respectively.

The substrates 121 and 125 each are formed of, for example, a transparent substrate such as a glass substrate, and an incident light ray can pass through the substrates 121 and 125. A voltage is supplied to the electrodes 122 and 124 from the authentication mode switching section 17. The electrodes 122 and 124 each are formed of a transparent electrode, for example, ITO (Indium Tin Oxide), and as in the case of the substrates 121 and 125, the incident light ray can pass through the electrodes 122 and 124. On a surface S1 of the electrode 122 of surfaces S1 and S2 of the electrodes 122 and 124, a plurality of concave curved surfaces are formed in a matrix form, thereby a plurality of liquid crystal microlens electrodes 122 are formed. The liquid crystal layer 123 is formed of, for example, a liquid crystal material such as nematic liquid crystal, and the refraction index of the liquid crystal layer 123 is changed according to a voltage applied between the electrodes 122 and 124.

Figure 5:
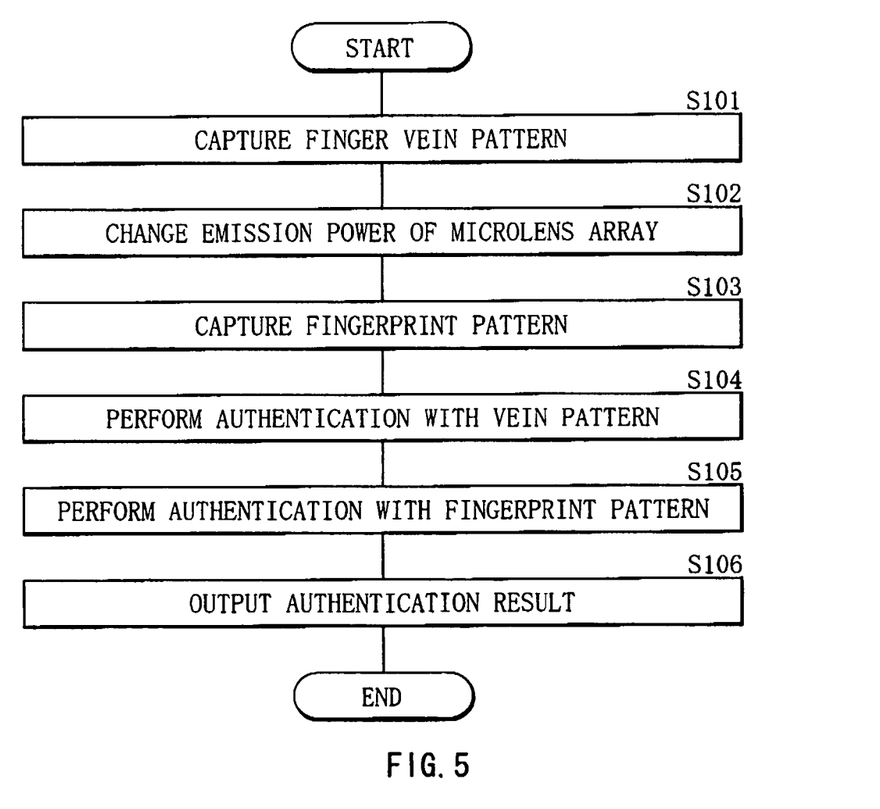
FIG. 5 is a flowchart showing a biometrics authentication process according to the second embodiment.
Figure 6:
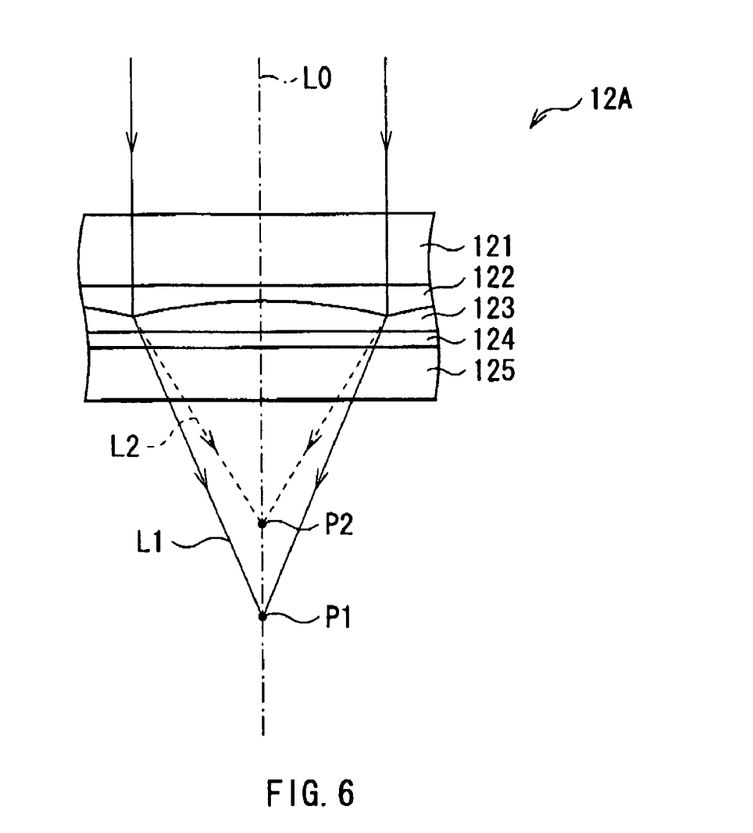
FIG. 6 is a schematic sectional view for describing a function of the microlens array shown in FIG. 3.
Figure 7:
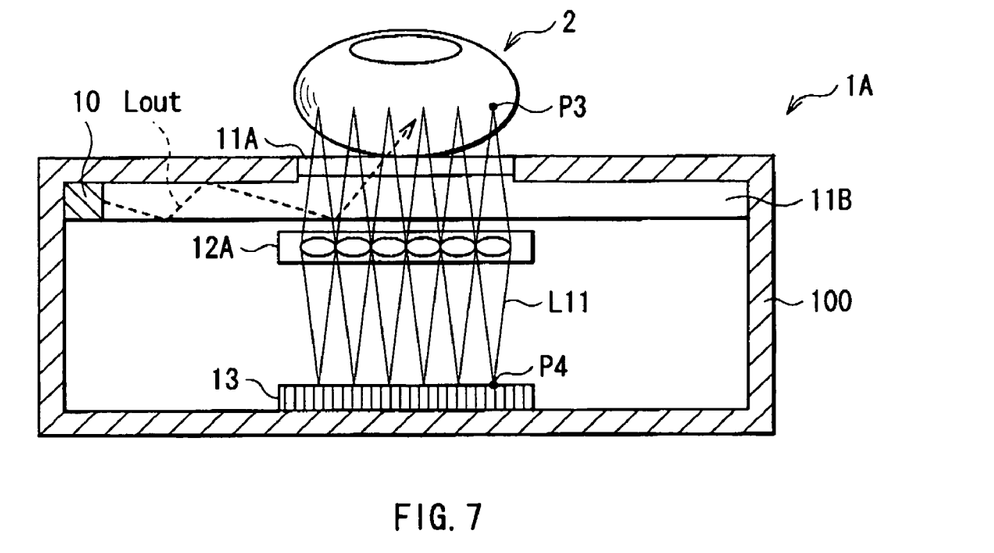
FIG. 7 is a sectional view of essential parts for describing an optical path when capturing a finger vein pattern in the second embodiment.
Figure 8:
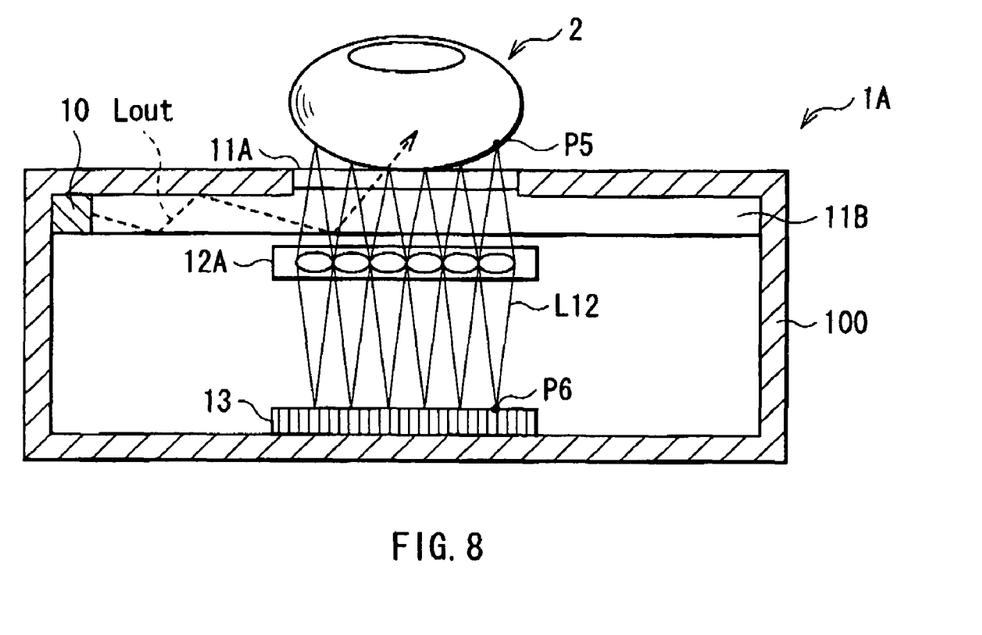
FIG. 8 is a sectional view of essential parts for describing an optical path when capturing a fingerprint pattern in the second embodiment.

Next, referring to FIGS. 3 to 8, the operation (a biometrics authentication process) of the biometrics authentication system 1A according to the embodiment will be described in detail below. FIG. 5 shows a flowchart of the biometrics authentication process, and FIG. 6 shows a schematic sectional view for describing a function of the microlens array 12A. FIG. 7 shows a sectional view of essential parts for describing an optical path when capturing a finger vein pattern, and FIG. 8 is a sectional view of essential parts for describing an optical path when capturing a fingerprint pattern.

In the biometrics authentication system 1A, at first, when the living organism (for example, a fingertip) 2 is placed on the cover glass 11A, light Lout is emitted from the light source 10 by the driving operation of the light source driving section 181, and the light Lout is applied to the living organism 2 through the light guide section 11B and the cover glass 11A. Then, a lower voltage than a predetermined threshold voltage is supplied to the microlenses in the microlens array 12A (more specifically between the electrodes 122 and 124) from the authentication mode switching section 17 in response to the control of the control section 19, and when an image of the living organism 2 is picked up in this state, the vein pattern of the living organism 2 is captured (step S101 in FIG. 5). More specifically, the voltage supplied to the microlenses is low, so the refractive index of the liquid crystal layer 123 is reduced according to the voltage, and as a result, for example, like a light ray L1 in FIG. 6, the incident light ray toward the microlenses is refracted in a refraction direction forming a relatively small refraction angle to be condensed at a relatively long focal length (for example, at a focal point position P1 on an optical axis L0 shown in FIG. 6). Therefore, for example, as shown in FIG. 7, the focal points of the microlenses are adjusted to the interior of the living organism 2 (a vein portion; for example, a point P3 on a light ray L11 in FIG. 7) and the top surface of the image pickup device 13 (for example, a point P4 on the light ray L11 in FIG. 7), thereby the image pickup data of the vein of each part of the living organism 2 can be captured. Then, the captured image pickup data of the vein of each part is subjected to image processing in the image processing section 14, thereby the single image pickup data of the vein of the living organism 2 (the vein pattern) is obtained, and inputted into the authentication section 16.

Next, the magnitude of the voltage supplied to the microlenses (more specifically between the electrodes 122 and 124) from the authentication mode switching section 17 is changed in response to the control of the control section 19 so as to be higher than the above-described predetermined threshold voltage, thereby the emission power of the microlens array 12A is changed (step S102). Then, when an image of the living organism 2 is picked up in this state, the fingerprint pattern of the living organism 2 is captured (step S103). More specifically, the voltage supplied to the microlenses is increased, so the refractive index of the liquid crystal layer 123 is increased accordingly, and as a result, for example, like a light ray L2 in FIG. 6, the incident light ray toward the microlenses is refracted in a refraction direction forming a larger refraction angle than that of the above-described light ray L1 to be condensed at a shorter focal length than that of the light ray L1 (for example, at a focal point position P2 on the optical axis L0 shown in FIG. 6). Therefore, for example, as shown in FIG. 8, the focal points of the microlenses are adjusted to around the surface of the living organism 2 (a fingerprint portion; for example, a point P5 on a light ray L12 in FIG. 8) and the top surface of the image pickup device 13 (for example, a point P6 on the light ray L12 in FIG. 8), thereby image pickup data of a fingerprint of each part of the living organism 2 is captured. Then, as in the case of the vein pattern, the captured image pickup data of the fingerprint of each part is subjected to image processing in the image processing section 14, thereby a single image pickup data (the fingerprint pattern) of the fingerprint of the living organism 2 is obtained, and inputted into the authentication section 16.

Next, in the authentication section 16, the inputted vein pattern is compared to the authentication pattern for vein authentication stored in the pattern storing section 15, thereby vein authentication is performed (step S104). Next, in the authentication section 16, the inputted fingerprint pattern is compared to the authentication pattern for fingerprint authentication stored in the pattern storing section 15, thereby fingerprint authentication is performed (step S105). Then, in the authentication section 16, a final result (authentication result data Dout) of the biometrics authentication in consideration of the result of the vein authentication and the result of the fingerprint authentication is outputted (step S106), thereby the biometrics authentication process according to the embodiment is completed.

Thus, in the biometrics authentication system 1A according to the embodiment, when the image of the living organism 2 is picked up while changing the voltage applied to the microlenses, the refraction direction of the incident light ray toward the microlenses is changed according to the magnitude of the applied voltage, thereby the focal length is changed. Therefore, in the case where an image of the living organism 2 is picked up with an increased focal length, a vein pattern is captured, and in the case where an image of the living organism 2 is picked up with a reduced focal length, a fingerprint pattern is captured. Therefore, according to the magnitude of the voltage applied to the microlenses, switching between the vein authentication mode and the fingerprint authentication mode can be performed.

As described above, in the embodiment, a plurality of microlenses capable of changing the refraction direction of the incident light ray according to the applied voltage and the authentication mode switching section 17 for applying a voltage to the microlenses are arranged, so the focal length of the incident light ray is changed according to the magnitude of the voltage applied to the microlenses, and switching of the authentication modes between biometrics authentication in the case where image pickup is performed with an increased focal length (vein authentication) and biometrics authentication in the case where image is performed with a reduced focal length (fingerprint authentication) can be performed. Moreover, a common image pickup optical system (the microlens array 12A and the image pickup device 13) between these authentication modes is used, so unlike related arts, it is not necessary to separately arrange an image pickup optical system for vein authentication and an image pickup optical system for fingerprint authentication, and the complication of the system configuration is prevented. Therefore, fingerprint authentication and vein authentication can be used with a simple configuration.

More specifically, the microlenses are formed of liquid crystal microlenses, so the refractive index of the liquid crystal layer 123 can be changed according to the presence or absence of the application of a voltage to the liquid crystal layer 123, and the refraction direction (the focal point position) of the incident light ray can be changed. Therefore, as described above, switching between the authentication modes can be performed with a simple configuration.

Moreover, switching between the authentication modes is electrically performed, so for example, compared to the case where a plurality of microlens arrays with different focal lengths are mechanically switched, reliability during the switching operation can be improved.

The final authentication result data Dout is obtained in consideration of both of the authentication results of vein authentication and fingerprint authentication, so compared to the case where final authentication result data is obtained through the use of one of the authentication results, the accuracy of authentication can be improved.

The image of the living organism 2 is picked up in a state in which the light Lout from the light source 10 is applied to the living organism 2, so an object subjected to image pickup can be highlighted, and clear image pickup data can be captured. Therefore, compared to the case where image pickup is performed only with natural light, the accuracy of authentication can be further improved.

In the case where the light source 10 emits near-infrared light, while the transmittance of light to the living organism 2 is improved, the absorption of light into the vein of the living organism 2 can be improved. Therefore, in such a configuration, the vein as an object subjected to image pickup at the time of vein authentication can be highlighted more clearly, and the accuracy of vein authentication and by extension to the whole authentication accuracy can be further improved.

Although the present invention is described referring to the first and second embodiments, the invention is not limited to the embodiments, and can be variously modified.

For example, in the second embodiment, the case where after the vein pattern is captured, the fingerprint pattern is captured is described; however, the order of capturing the vein pattern and the fingerprint pattern may be changed. In other words, at first, the authentication mode switching section 17 may apply a higher voltage than the predetermined threshold voltage to the microlens array 12A to capture the fingerprint authentication pattern, and after that, the applied voltage may be changed to be lower than the predetermined threshold voltage, then the vein pattern may be captured.

Moreover, in the second embodiment, the case where on the basis of the captured vein pattern and the captured fingerprint pattern, after vein authentication is performed, fingerprint authentication is performed is described; however, after fingerprint authentication is performed, vein authentication may be performed, or in some cases, vein authentication and fingerprint authentication may be performed concurrently. In the case where these two authentication processes are performed concurrently, the whole authentication process can be performed more speedily.

In the second embodiment, the case where when capturing the vein pattern of the living organism 2, a lower voltage than the predetermined threshold voltage is supplied to the microlenses in the microlens array 12A from the authentication mode switching section 17 to reduce the refractive index of the liquid crystal layer 123 and the refraction angle of the incident light ray to the microlenses, and when capturing the fingerprint pattern of the living organism 2, a higher voltage than the predetermined threshold voltage is supplied to the microlenses in the microlens array 12A from the authentication mode switching section 17 to increase the refractive index of the liquid crystal layer 123 and the refraction angle of the incident light ray to the microlenses is described; however, depending on the kind of the liquid crystal material of the liquid crystal layer 123, when capturing the vein pattern of the living organism 2, a higher voltage than the predetermined threshold voltage can be supplied to the microlenses in the microlens array 12A from the authentication mode switching section 17 to reduce the refractive index of the liquid crystal layer 123 and the refraction angle of the incident light ray to the microlenses, and when capturing the fingerprint pattern of the living organism 2, a lower voltage than the predetermined threshold voltage can be supplied to the microlenses in the microlens array 12A from the authentication mode switching section 17 to increase the refractive index of the liquid crystal layer 123 and the refraction angle of the incident light ray to the microlenses. In such a configuration, the same effects as those in the second embodiment can be obtained.

As long as at least vein authentication can be performed by transmitting light into the living organism 2 to illuminate the interior of the living organism 2, the light Lout emitted from the light source 10 is not necessarily near-infrared light, and as long as at least vein authentication can be performed, the light source 10 may not be arranged. In the case where the light source 10 is not arranged, the system configuration can be simplified, and the size of the whole system can be reduced.

In the above-described embodiments, a bottom lighting system in which the light source 10 is arranged below the detection section is described; however, the invention is not limited to the lighting system, and, for example, a side lighting system in which the light source 10 is arranged at the side of the detection section may be used. Moreover, in the case where the living organism 2 is a fingertip, the direction of lighting is not limited to the width (lateral) direction of a finger, and, for example, lighting may be performed along the longitudinal direction of a finger, or both of the lateral direction and the longitudinal direction of a finger.

In the above-described embodiments, the case where after the image pickup data captured by the image pickup device 13 is subjected to image processing in the image processing section 14 as appropriate, authentication is performed is described; however, for example, in some cases, without arranging the image processing section 14, the authentication section 16 may directly perform authentication on the basis of the image pickup data from the image pickup device 13. In such a configuration, the system configuration can be further simplified, and the size of the whole system can be further reduced.

In the second embodiment, the case where in the microlens array 12A, the surface S1 of the surfaces S1 and S2 of the electrodes 122 and 124 has curved surfaces is described; however, for example, the surface S2 may also have curved surfaces, thereby microlenses with curved surfaces on both sides of the liquid crystal layer 123 may be formed.

In the second embodiment, in the case where the microlenses are formed of liquid crystal microlenses is described; however, as long as the microlenses can change the refraction direction of the incident light ray according to the applied voltage, microlenses with any other configuration may be used, and, for example, liquid microlenses using two liquid layers of different kinds may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A biometrics authentication system comprising:
   a microlens array section including a plurality of microlenses,
   wherein the microlenses are capable of changing a refraction direction of an incident light ray according to an applied voltage;
   a voltage supplying section for applying a voltage to the microlenses;
   an image pickup device for receiving light condensed by each microlens in the microlens array section from each different part of a living organism to obtain image pickup data of each part;
   an image processing section for producing a single image pickup data of the living organism on the basis of the image pickup data of each part captured by the image pickup device;
   an authentication section for performing at least vein authentication using a vein of the living organism on the basis of the single image pickup data captured by the image processing section; and
   a control section for controlling the voltage supplying section,
   wherein when image pickup data for vein authentication using a vein of the living organism is captured, the control section controls a voltage supplied to the microlens array section from the voltage supplying section to be lower than a predetermined voltage value, and when image pickup data for fingerprint authentication using a fingerprint of the living organism is captured, the control section controls the voltage to be higher than the predetermined voltage value.

2. The biometrics authentication system according to claim 1, comprising:
   a control section for controlling the voltage supplying section,
   wherein when image pickup data for vein authentication using a vein of the living organism is captured, the control section controls a voltage supplied to the microlens array section from the voltage supplying section to be higher than a predetermined voltage value, and when image pickup data for fingerprint authentication using a fingerprint of the living organism is captured, the control section controls the voltage to be lower than the predetermined voltage value.

3. The biometrics authentication system according to claim 1, wherein
   the authentication section performs at least one of vein authentication and fingerprint authentication on the basis of the image pickup data for vein authentication and the image pickup data for fingerprint authentication.

4. The biometrics authentication system according to claim 3, wherein
   the authentication section performs the vein authentication and the fingerprint authentication, and in consideration of the results of the vein authentication and the fingerprint authentication, a final result of biometrics authentication is outputted.

5. The biometrics authentication system according to claim 1, wherein
   the microlens array section includes:
   a pair of substrates;
   a pair of electrodes to which a voltage from the voltage supplying section is applied, the pair of electrodes being formed on the substrates; and
   a liquid crystal layer arranged between the pair of electrodes, and
   at least one of the pair of electrodes has curved surfaces for forming the microlenses.

6. The biometrics authentication system according to claim 1, comprising:
   a light source for applying light to the living organism.

7. The biometrics authentication system according to claim 6, wherein
   the light source emits light of a near-infrared wavelength region.

8. A biometrics authentication method comprising:
   a data capturing step of picking up an image of a living organism by a plurality of microlenses and an image pickup device, receiving light condensed by each microlens from each different part of the living organism to obtain image pickup data of each part, and capturing a single image pickup data of the living organism by performing image processing on the basis of the captured image pickup data of each part; and an authentication step of performing at least vein authentication using a vein of the living organism on the basis of the captured single image pickup data, wherein in the data capturing step, through the use of a plurality of microlenses capable of changing the refraction direction of an incident light ray according to an applied voltage, an image of a living organism is picked up while changing the refraction direction of an incident light ray by changing a voltage applied to each microlens, and then vein image pickup data and fingerprint image pickup data of the living organism are captured, and in the authentication step, vein authentication and fingerprint authentication are performed on the basis of the captured vein image pickup data and the captured fingerprint image pickup data, and wherein the data capturing step includes:

a step of performing image pickup in a state in which a lower voltage than a predetermined voltage value is applied to the microlenses to capture the vein image pickup data; and a step of performing image pickup in a state in which a higher voltage than the predetermined voltage value is applied to the microlenses to capture the fingerprint image pickup data.

9. The biometrics authentication method according to claim 8, wherein the data capturing step includes:

a step of performing image pickup in a state in which a higher voltage than a predetermined voltage value is applied to the microlenses to capture the vein image pickup data; and a step of performing image pickup in a state in which a lower voltage than the predetermined voltage value is applied to the microlenses to capture the fingerprint image pickup data.

* * * * *